(12) United States Patent
Johnson (10) Patent No.: US 10,151,831 B2
(45) Date of Patent: Dec. 11, 2018

(54) GOLF BALL SPIN AXIS MEASUREMENT

(71) Applicant: EDH US LLC, Orlando, FL (US)

(72) Inventor: Henri Johnson, Windermere, FL (US)

(73) Assignee: EDH (US) LLC, Orlando, FL (US)

( * ) Notice: Subject to any disclaimer, the term of this patent is extended or adjusted under 35 U.S.C. 154(b) by 346 days.

(21) Appl. No.: 15/101,815

(22) PCT Filed: Dec. 3, 2014

(86) PCT No.: PCT/US2014/068310
§ 371 (c)(1),
(2) Date: Jun. 3, 2016

(87) PCT Pub. No.: WO2015/084928
PCT Pub. Date: Jun. 11, 2015

(65) Prior Publication Data
US 2016/0306035 A1    Oct. 20, 2016

Related U.S. Application Data

(60) Provisional application No. 61/911,404, filed on Dec. 3, 2013.

(51) Int. Cl.
*G01S 13/58* (2006.01)
*G01S 13/87* (2006.01)
*G01S 13/88* (2006.01)

(52) U.S. Cl.
CPC .......... *G01S 13/58* (2013.01); *G01S 13/878* (2013.01); *G01S 13/88* (2013.01)

(58) Field of Classification Search
CPC ......... G01S 13/58; G01S 13/878; G01S 13/88

USPC ........................................................ 342/104
See application file for complete search history.

(56) References Cited

U.S. PATENT DOCUMENTS

| | | | |
|---|---|---|---|
| 5,082,263 | A  | 1/1992 | Berger et al. |
| 5,138,322 | A  | 8/1992 | Nutall |
| 6,244,971 | B1 | 6/2001 | Mihran |
| 6,292,130 | B1 | 9/2001 | Cavallaro et al. |
| 6,547,671 | B1 | 4/2003 | Mihran |

(Continued)

FOREIGN PATENT DOCUMENTS

WO    WO-2015084928 A1    6/2015

OTHER PUBLICATIONS

"International Application Serial No. PCT/US2014/068310, International Preliminary Report on Patentability dated Mar. 16, 2016", 14 pgs.

(Continued)

*Primary Examiner* — Timothy A Brainard
(74) *Attorney, Agent, or Firm* — Schwegman (57) ABSTRACT

Systems, methods and media are provided for golf ball spin axis measurement. In one example, a method comprises detecting a launched golf ball, receiving reflected Doppler signals from the golf ball by a radar device having an array of multiple receiver pairs, demodulating the spin-induced signals from the received signals, determining a time delay between the demodulated signals for the receiver pairs in the array, calculating an average time delay for the multiple receiver pairs, calculating a spin axis of the golf ball from the time delay values, outputting a spin axis value to an external system, and storing the spin axis value in a database.

5 Claims, 5 Drawing Sheets

(56) References Cited

U.S. PATENT DOCUMENTS

2002/0107078 A1* 8/2002 Collins .............. A63B 24/0021
  473/152
2013/0304417 A1 11/2013 Mooney et al.

OTHER PUBLICATIONS

"International Application Serial No. PCT/US2014/068310, International Search Report dated Mar. 9, 2015", 2 pgs.
"International Application Serial No. PCT/US2014/068310, Written Opinion dated Mar. 9, 2015", 4 pgs.

* cited by examiner

GOLF BALL SPIN AXIS MEASUREMENT

RELATED APPLICATIONS

This application is a U.S. National Stage Filing under 35 U.S.C. 371 from International Application No. PCT/US2014/068310, filed on Dec. 3, 2014, and published as WO 2015/084928 on Jun. 11, 2015, which claims priority from U.S. Provisional Patent Application Ser. No. 61/911,404, filed Dec. 3, 2013, which are incorporated herein by reference in their entirety and made a part hereof.

BACKGROUND

It is difficult to determine golf ball spin axis through direct measurement. This disclosure provides a means and method to measure golf ball spin axis directly by making use of an appropriately spaced array of Doppler radar receivers.

Conventionally, the flight path of a golf ball is determined mainly by its launch speed, launch angle relative to the horizontal, and spin. Golf ball spin is caused by using a lofted club with a grooved club face. Spin imparts aerodynamic forces on a ball due to the interaction between the dimpled surface of the ball and the surrounding air fluid. In a golf ball, a lifting force opposite to gravity causes the ball to stay airborne longer and allowing a golfer to achieve greater carry distances than if no such force was present.

A golfer can also intentionally or unintentionally cause a golf shot to follow a horizontally curved trajectory if the ball spin axis is orientated to allow a lateral aerodynamic force to be generated.

Current Doppler radars use indirect methods to estimate golf ball spin axis. One example is to estimate the spin axis from analyzing the lateral curvature in the trajectory, and the horizontal trajectory, from which spin values can be estimated. This method is limited in that it has to observe the ball flight for an extended time period (not possible in an indoor test environment or fitting studio), and is affected by wind which disturbs the trajectory, and radar alignment errors. Another example is to measure the relative directions of the club and the ball at impact, and to calculate an estimate of the horizontal and lateral spin components that can result from the strike. Current camera-based systems are also used to measure golf ball spin axis. Cameras are generally poor at measuring high speed objects such as moving golf balls. High speed cameras are costly and suffer from difficulties in alignment, illumination, and measurement reliability. Many camera-based spin measuring systems also require some form of ball marking. Current methods also usually involve determining complex three-dimensional movement from limited and blurred two-dimensional images, leading to inaccurate results or even failing to provide a result.

This disclosure addresses these problems and provides a system and method to directly measure the ball spin axis from signals received in multiple spaced Doppler radar receivers.

SUMMARY

The systems and methods proposed herein use a Doppler radar with an array of appropriately spaced receivers to measure a golf ball spin axis. The Doppler radar typically has a transmitter co-located with multiple receivers (typically three or four). The receivers are arranged and spaced in a predefined pattern with at least two forming a horizontal pair and two forming a vertical pair. In a more general case the arrangement can be in any perpendicular set of coordinates. The transmitter and receivers are placed in a vantage position from which the golf ball launch can be measured, for example several feet directly behind the ball tee position.

The signals received immediately after ball launch are analyzed to determine the time differences received in a vertical receiver pair and a horizontal receiver pair. If four receivers are used, two vertical and two horizontal pairs can be arranged to provide two independent measurements in the horizontal and vertical directions, with improved statistical accuracy.

The spin axis is calculated as a trigonometric function of the ratio between measured time horizontal and vertical time differences.

This disclosure provides a system and method to directly measure the ball spin axis from signals received in multiple spaced Doppler radar receivers, and can be used in a Doppler radar designed to measure the motions of a moving body, especially to measure the axis of rotational motion. This includes systems for measuring the movement and spin of sports balls, such as golf launch monitors.

In this specification, the term "golf ball" is used but is intended to cover any spinning projectile that can be tracked in the air.

Thus, an example method includes detecting a launched golf ball; receiving reflected Doppler signals from the golf ball by a radar device having an array of multiple receiver pairs; demodulating the received Doppler signals from the multiple receivers; determining a time delay between the demodulated received signals for each of the receiver pairs in the array; calculating an average time delay for the multiple receiver pairs; calculating a spin axis of the golf ball from the time delay values; outputting a spin axis value to an external system; and storing the spin axis value in a database.

The method may further comprise arranging the receivers in at least one of the receiver pairs vertically one above the other, and arranging the receivers in at least one of the receiver pairs horizontally next to one another.

The relationship between the spin axis value and the average time delay value may be generalized for a vertically spaced receiver pair by:

$$TV = (SV/D) \times \cos(PHI)$$

and for a horizontally spaced receiver pair by:

$$TH = (SH/D) \times \sin(PHI)$$

where TV and TH are the vertical and horizontal time delays, SV and SH are the vertical and horizontal receiver spacings, and D is the distance from the Doppler radar to the ball at the moment of measurement.

The spin axis may be calculated directly from the time delays and receiver separations by:

$$PHI = \arctan[SH \times TH/(SV \times TV)].$$

In another embodiment, a non-transitory machine-readable medium contains instructions that, when read by a machine, cause the machine to perform operations comprising: receiving reflected Doppler signals from a golf ball by a radar device having an array of multiple receiver pairs; demodulating the received Doppler signals from the multiple receivers; determining a time delay between the demodulated received signals for each of the receiver pairs in the array; calculating an average time delay for the multiple receiver pairs; calculating a spin axis of the golf ball from the time delay values; outputting a spin axis value to an external system; and storing the spin axis value in a database.

These and other examples and features of the present disclosure will be set forth in part in the following Detailed Description. This Summary is intended to provide non-limiting examples of the present subject matter—it is not intended to provide an exclusive or exhaustive explanation. The Detailed Description below is included to provide further information about the present systems, methods and machine-readable media.

DESCRIPTION OF THE DRAWINGS

The example embodiments may be better understood, and its numerous features and advantages made apparent to those skilled in the art by referencing the accompanying drawings and descriptions provided in the Detailed Description. For ease of understanding and simplicity, common numbering of elements within the illustrations is employed where an element is the same in different drawings. In the drawings, which are not necessarily drawn to scale, like numerals may describe similar components in different views. In some instances, different numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following is a detailed description of illustrative embodiments of the present invention. As these embodiments of the present invention are described with reference to the aforementioned drawings, various modifications or adaptations of the methods and or specific structures described may become apparent to those skilled in the art. All such modifications, adaptations, or variations that rely upon the teachings of the present inventions, and through which these teachings have advanced the art, are considered to be within the spirit and scope of the present invention. Hence, these descriptions and drawings are not to be considered in a limiting sense, as it is understood that the present invention is in no way limited to the embodiments illustrated.

Viewed broadly, an example system and method to measure a ball spin axis includes the following components and/or steps: a Doppler radar with multiple receiver channels, a processor, a launched golf ball, receiving reflected Doppler signals from the spinning ball, determining a time delay in a vertical receiver pair, determining a time delay in a horizontal receiver pair, calculating a spin axis orientation, outputting a spin axis value, an output device, storing a spin axis value, and a data storage device.

Figure 1:
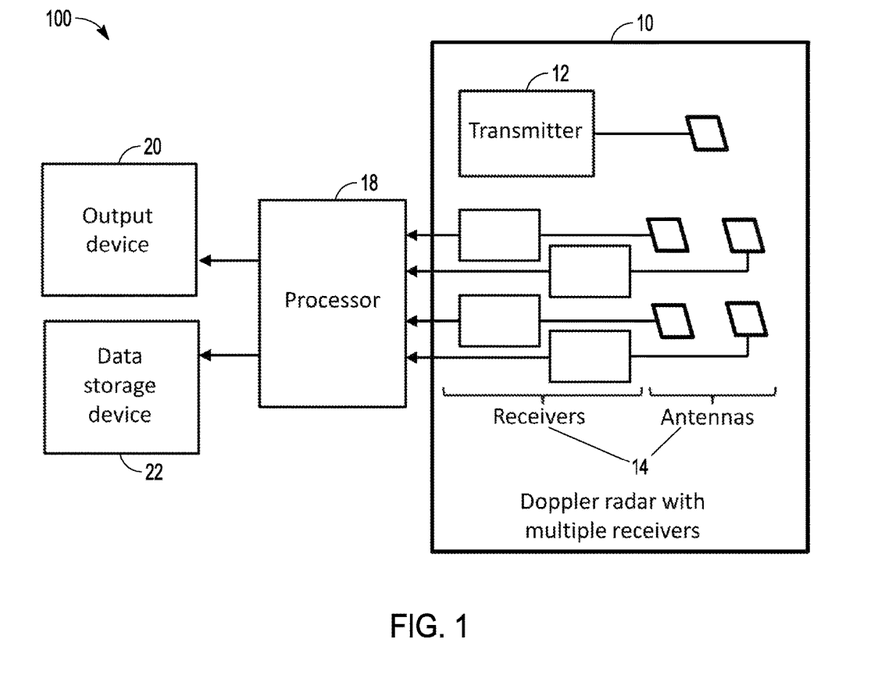
FIG. 1 is a schematic view of components of a system for golf ball spin axis measurement, according to example embodiments.

With reference to FIG. 1, a system 100 includes a Doppler radar 10 to track a golf ball (not shown). The radar 10 comprises a transmitter 12 and multiple receivers 14 (antennas) that are spaced in pairs with vertical and horizontal separation.

After launch of the golf ball, the Doppler radar 10 receives the reflected Doppler signals from the golf ball in the multiple receivers 14. A processor 18 determines the time delay in the received Doppler signals received in a vertically separated receiver pair. The processor 18 also determines the time delay in the signals from a horizontally spaced receiver pair. The processor 18 subsequently uses the vertical and horizontal time differences, together with the known receiver antenna separation distances to calculate the ball spin axis orientation. The calculated spin axis value can be output to an output device 20. The calculated spin axis value can be stored in a data storage device 22 for later utilization.

Figure 3:
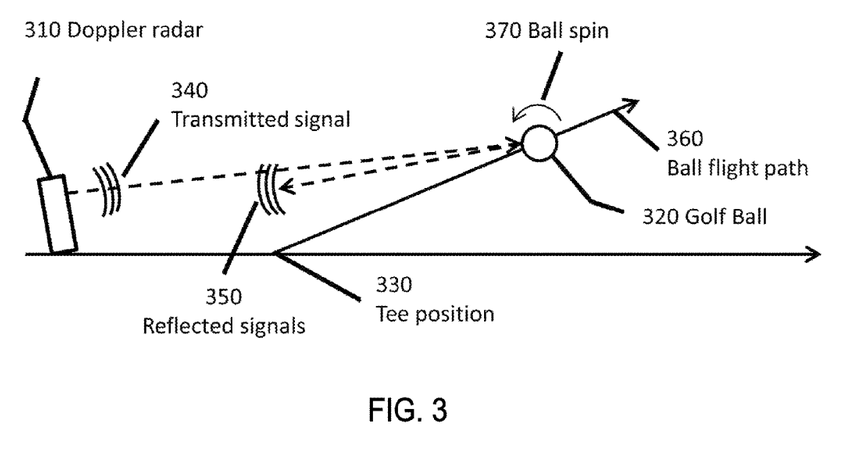
FIG. 3 is a schematic view of aspects of a system and method to determine a golf ball spin axis, according to an example embodiment.

With reference to FIG. 3, a Doppler radar 310 tracks a golf ball 320 which is launched from a tee position 330. The golf ball has a ball spin direction 370 (in this case backspin) travelling along a flight path 360. The Doppler radar transmits signals 340 to the golf ball 320 and these are reflected back at 350 where they are analyzed by a processor (e.g. processor 18, FIG. 1).

The disclosed components work as follows. The Doppler radar 310 with multiple receivers tracks the golf ball 320 launched from the tee 330 and traveling along the flight path 360. Ball spin 370 is caused by the golf club strike. The radar signals 350 reflected by the golf ball are received in the receivers in the radar 310. The receivers are arranged to provide at least one horizontal pair and one vertical pair. The separation distances for each pair are fixed. The receiver separation has the effect that the signals reflected from the ball will arrive at different times due to the geometrical arrangement of the ball and the receivers.

The reflected signal from a spinning golf ball exhibits spreading of the Doppler shift around the average due to the spinning motion. In addition, periodic modulation effects are caused by non-homogeneities on the ball such as dimples, seam, and markings. The golf ball can also be marked deliberately to produce measureable modulation in the Doppler signals. The modulation of the Doppler signal is time-varying and can be detected by any known means of demodulation, such as using a phase locked demodulator or short duration Fourier transform (SDFT) methods. The demodulated signals are compared to determine the arrival time difference, by using cross-correlation or other methods.

Figure 4:
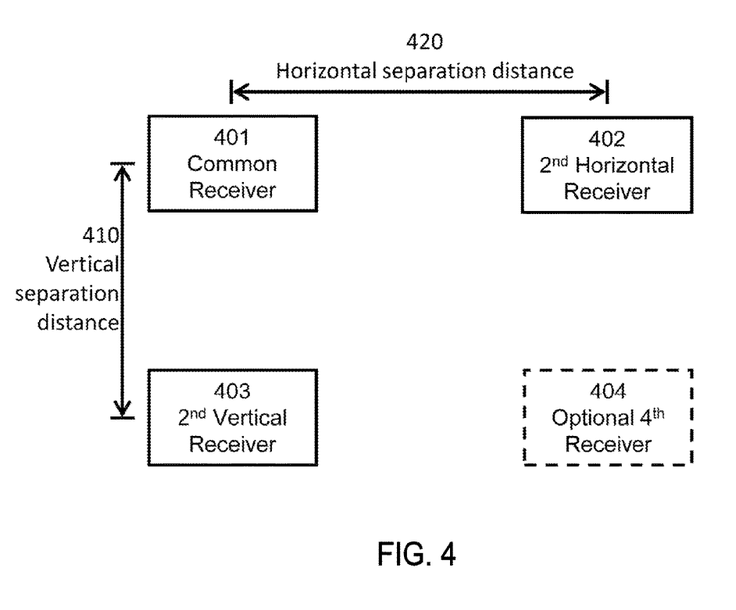
FIG. 4 is a schematic view of an antenna array, according to an example embodiment.

With reference to FIG. 4, let one receiver pair, receivers 401 and 403, be vertically spaced one above the other. A signal reflected from a golf ball with back spin will reach the upper receiver 401 before it reaches the lower receiver 403 with a measurable time difference. Similarly a pair of horizontally separated receivers 401 and 402 will receive reflected signals with a finite time difference if the ball has a side spin component.

Assume that the ball as well as the vertical receiver pair is spaced by distance S is in the same geometric plane. Also assume that the ball spin axis PHI is perpendicular to the plane. The spin axis orientation will be generalized later. Assume further that the ball distance D, being the distance between the ball and the Doppler radar at the moment of measurement, is much larger than the receiver spacing S. This assumption is valid for most practical applications.

Figure 5:
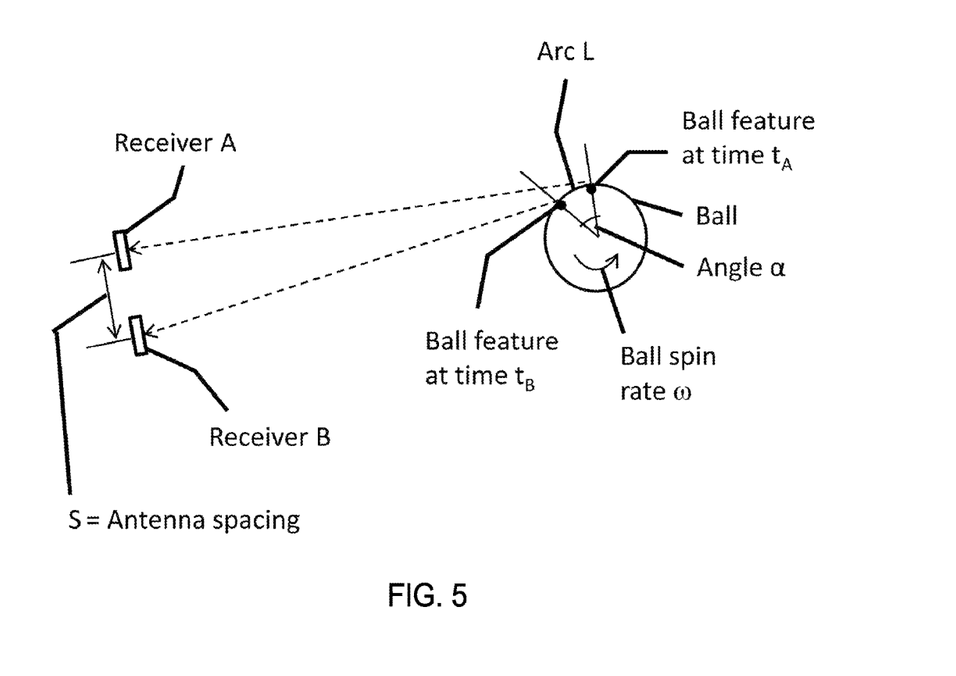
FIG. 5 is a further schematic view showing further aspects of a system and method to determine a golf ball spin axis, according to an example embodiment.

With reference to FIG. 5, also assume that the ball is equidistant from the receivers. This assumption will be removed later. A feature or disconformity on the spinning golf ball causes an observable modulation in the signal received at the first receiver at a given time because of the geometrical position of the ball relative to the receiver. The ball continues to rotate to a next position where the modulating feature is in a position where its effect is received at the second receiver at a delayed time. During this elapsed time the ball rotated through an angle which is equal to the spin rate multiplied by the time delay. Let L be the arc length along the ball surface subtended by angle a. If the angle is small, which will be true in most practical cases, $\alpha=L/R=S/D$ where L=arc length, R=ball radius, S=receiver separation and D is ball distance. This represents the maximum time delay between the signals received at receivers for the given ball and receiver geometry.

Now consider the case where the ball spin axis is parallel to the plane containing the receivers and the ball and parallel to the line connecting the receivers. The spin axis angle PHI is now 90 degrees. In this case, the vertical receiver pair will observe the modulation effects in the Doppler signal caused by ball spin at the same time instant because of the geometry.

The relation between ball spin axis and time delay can be generalized for a vertical receiver pair by the relation $TV=(SV/D)\times\cos(PHI)$ and for a horizontally spaced receiver pair by $TH=(SH/D)\times\sin(PHI)$, where TV and TH are the vertical and horizontal time delays and SV and SH are the vertical and horizontal receiver pacings. D is the ball distance at the time of measurement.

By dividing TH by TV, and solving the equation for PHI allows the spin axis to be calculated directly as follows from the time delays and receiver spacings:

$$PHI = \arctan[SH \times TH/(SV \times TV)].$$

The method preferably uses a Doppler radar equipped with at least three receivers spaced in a predetermined manner to measure the spin-modulated Doppler shifted reflections from a launched golf ball. It is usually preferable that the golf ball, whose spin axis must be measured, be launched from a distance much larger than the spacing distance between the receiver antennas, and also much larger than the dimensions of the golf ball, so that certain geometric approximations are valid.

It is typically necessary that the golf ball have at least one feature that will cause periodic time-varying modulation of the Doppler signals reflected from the ball. The final essential element of the present disclosure is a signal processing system that can determine the time delays between signals received at the various receivers, and that can calculate the spin axis from the ratio of time delays and other constants such as receiver spacing distances.

Optional elements include additional receivers (e.g. optional $4^{th}$ receiver 404 in FIG. 4) that can be arranged to provide multiple perpendicular receiver pairs. This configuration will allow the processor to determine the average of multiple time delay measurements resulting in improved measurement certainty. An output device can be added to display or transmit the calculated pin axis value. A data storage device can be used to store the spin axis value for later utilization. Receiver pairs can be arranged other than in "horizontal and vertical" configurations with appropriate coordinate transformations to determine spin axis in real world coordinates.

Some embodiments of the present inventive subject matter include methods of measuring the spin axis of a golf ball. These method embodiments are also referred to herein as "examples." Such examples can include method elements in addition to those shown or described. However, the present inventor also contemplates examples in which only those method elements shown or described are provided. Moreover, the present inventor also contemplates examples using any combination or permutation of those method elements shown or described above (or one or more aspects thereof), either with respect to a particular example (or one or more aspects thereof), or with respect to other examples (or one or more aspects thereof) shown or described herein.

Figure 2:
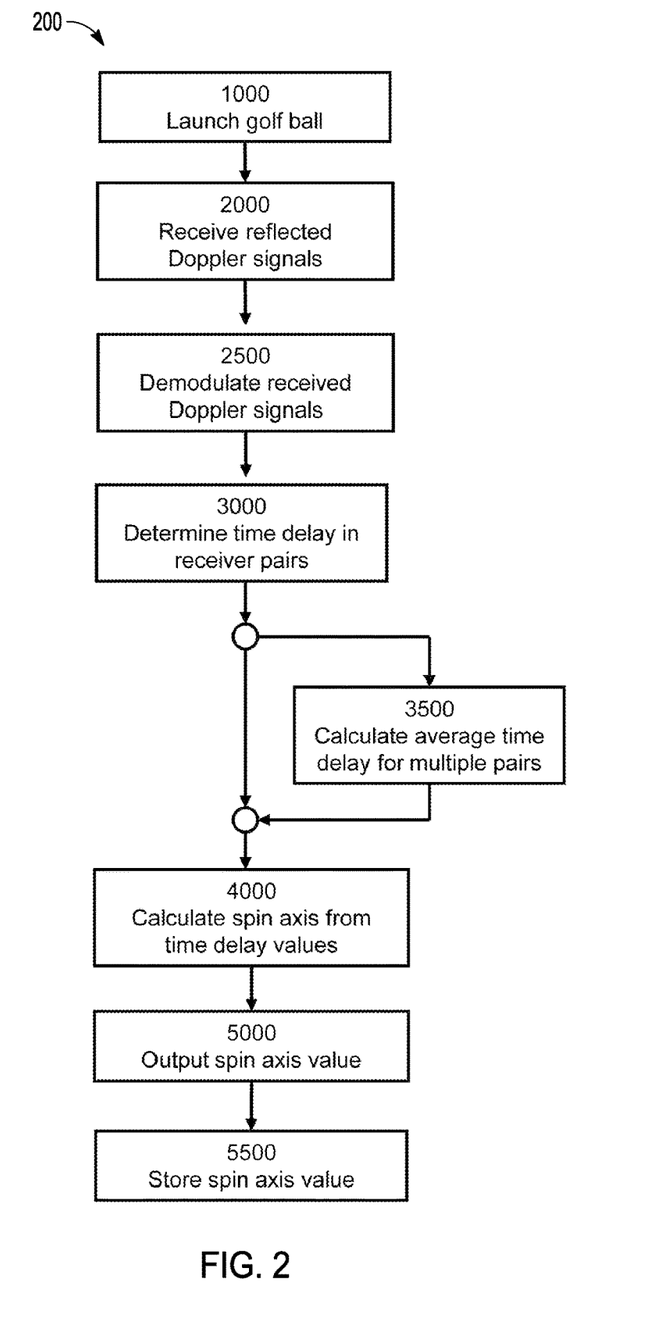
FIG. 2 is a flow diagram showing operations of a method, according to an example embodiment.

With reference to FIG. 2, an example method 200 includes, at operation 1000, detecting a launched golf ball; at operation 2000, receiving reflected Doppler signals from the golf ball; at operation 2500, demodulating the received Doppler signals; at operation 3000, determining the time delays between the demodulated signals from the radar receiver pairs; at operation 3500, calculating an average time delay for multiple radar receiver pairs, if more than one pair is used per direction; at operation 4000, calculating a spin axis from the time delay values; at operation 5000, outputting a spin axis value to an external system; and at operation 5500, storing the spin axis value.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures usually require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 6:
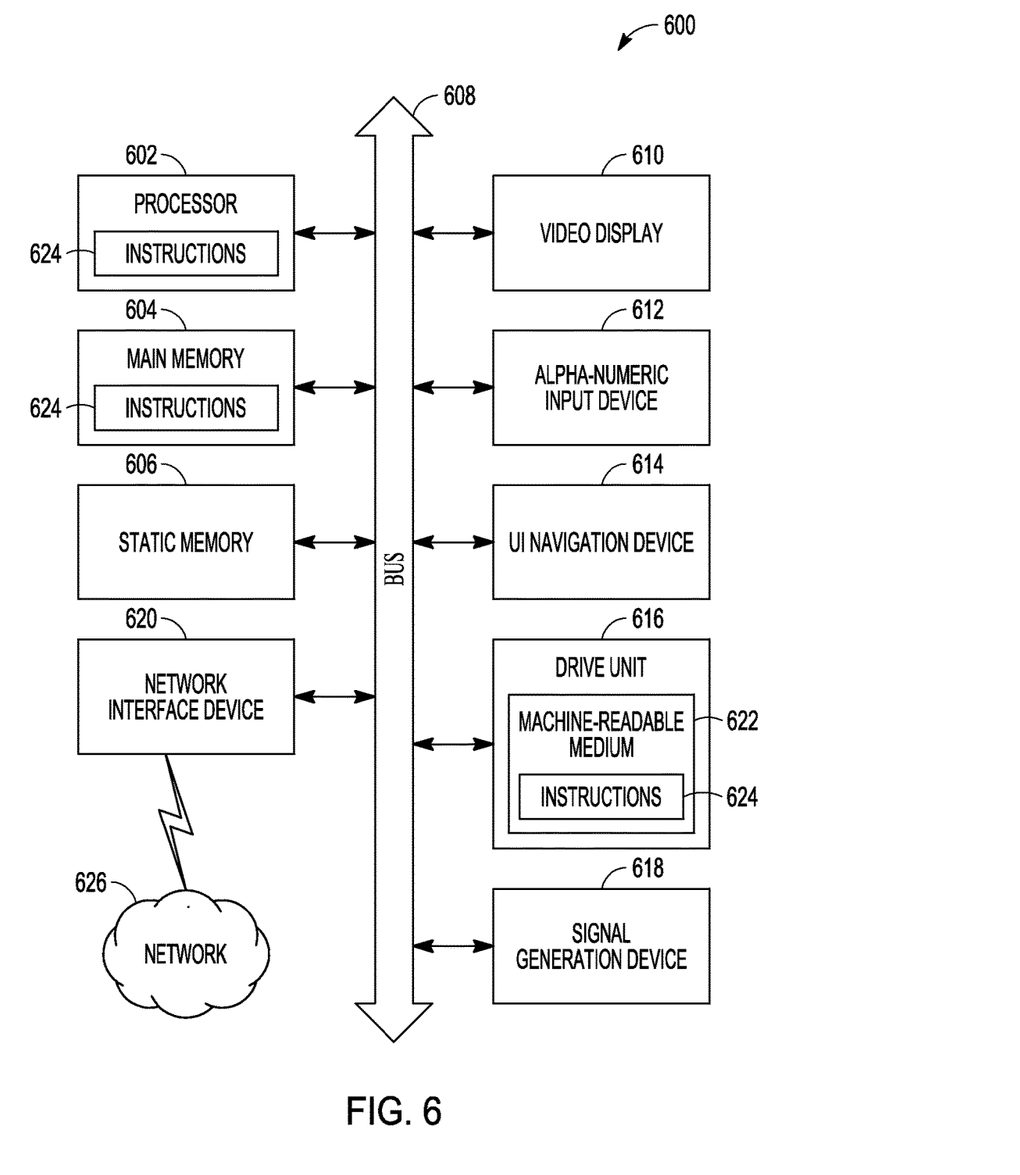
FIG. 6 is a block diagram of a machine in the example form of a computer system within which a set of instructions may be executed for causing the machine to perform any one or more of the methodologies herein discussed.

FIG. 6 is a block diagram of machine in the example form of a computer system 600 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a smart TV, a set-top box (STB), a PDA, a cellular telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD), light emitting display (LED) or a cathode ray tube (CRT). The computer system 600 also includes an alphanumeric input device 612 (e.g., a keyboard), a user interface (UI) navigation or cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, with the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more data structures or instructions 624. The term "machine-readable medium" shall also be taken to include any tangible medium that is capable of storing, encoding, or carrying instructions for execution by the machine and that cause the machine to perform any one or more of the methodologies of the embodiments of the present invention, or that is capable of storing, encoding or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 624 may further be transmitted or received over a communications network using a transmission medium. The instructions 624 may be transmitted using the network interface device 620 and any one of a number of well-known transfer protocols (e.g., HTTP). Examples of communication networks include a LAN, a WAN, the Internet, mobile telephone networks, Plain Old Telephone (POTS) networks, and wireless data networks (e.g., Wi-Fi™ and WiMax™ networks). The term "transmission medium" shall be taken to include any intangible medium that is capable of storing, encoding or carrying instructions for execution by the machine, and includes digital or analog communications signals or other intangible media to facilitate communication of such software.

While the invention has been described with reference to specific embodiments, it will be understood by those skilled in the art that various changes may be made and equivalents may be substituted for the elements thereof without departing from the true spirit and scope of the invention. In addition, modifications may be made without departing from the essential teachings of the invention. Moreover, each of the non-limiting examples described herein can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method comprising:
   detecting a launched golf ball;
   receiving reflected Doppler signals from the golf ball by a radar device having an array of at least two receiver pairs arranged in respective planes that are perpendicular to each other;
   demodulating the received Doppler signals from the multiple receivers;
   determining a time delay between the demodulated received signals for each of the receiver pairs in the array;
   calculating a spin axis of the golf ball from a ratio of the respective time delay values, the spin axis being calculated relative to a plane in which a first receiver pair of the at least two receiver pairs lies, the spin axis being further calculated directly from the time delays and receiver separation distances by:

$PHI = \arctan[S1 \times T1/(S2 \times T2)]$, where T1 and T2 are time delays associated with the first receiver pair and a second receiver pair of the at least two receiver pairs, and S1 and S2 are separation distances associated with the first receiver pair and the second receiver pair;
   outputting a spin axis value to an external system; and
   storing the spin axis value in a database.

2. The method of claim 1, further comprising arranging the receivers in at least one of the receiver pairs vertically one above the other.

3. The method of claim 2, further comprising arranging the receivers in at least one of the receiver pairs horizontally next to one another.

4. The method of claim 3, further comprising calculating an average time delay value for the at least two receiver pairs, wherein the relation between the spin axis value and the average time delay value is generalized for a second receiver pair by:

$T2 = (S2/D) \times \cos(PHI)$ and for a first receiver pair that is arranged to be perpendicular to the second receiver pair by:

$T1 = (S1/D) \times \sin(PHI)$ where D is the distance from the Doppler radar to the ball at the moment of measurement.

5. A non-transitory machine-readable medium containing instructions that, when read by a machine, cause the machine to perform operations comprising:
   receiving reflected Doppler signals from a golf ball by a radar device having an array of at least two receiver pairs arranged in respective planes that are perpendicular to each other;
   demodulating the received Doppler signals from the multiple receivers;
   determining a time delay between the demodulated received signals for each of the receiver pairs in the array;
   calculating a spin axis of the golf ball from a ratio of the respective time delay values, the spin axis being calculated relative to a plane in which a first receiver pair of the at least two receiver pairs lies, the spin axis being further calculated directly from the time delays and receiver separation distances by:

$PHI = \arctan[S1 \times T1/(S2 \times T2)]$, where T1 and T2 are time delays associated with the first receiver pair and a second receiver pair of the at least two receiver pairs, and S1 and S2 are separation distances associated with the first receiver pair and the second receiver pair;

outputting a spin axis value to an external system; and
storing the spin axis value in a database.

\* \* \* \* \*